United States Patent
Weekes et al.

(10) Patent No.: US 11,661,193 B2
(45) Date of Patent: May 30, 2023

(54) UNMANNED AERIAL VEHICLE OPTIMIZATION

(71) Applicant: ELROY AIR, INC., San Francisco, CA (US)

(72) Inventors: Terik Weekes, San Francisco, CA (US); Bernard Michini, San Francisco, CA (US); Sean Belardo, San Francisco, CA (US); David Merrill, San Francisco, CA (US); Clint Cope, San Francisco, CA (US); Colin Owen, San Francisco, CA (US); Isaiah Jones, San Francisco, CA (US); Matthew Michini, San Francisco, CA (US)

(73) Assignee: ELROY AIR, INC., South San Francisco, CA (US)

(*) Notice: Subject to any disclaimer, the term of this patent is extended or adjusted under 35 U.S.C. 154(b) by 362 days.

(21) Appl. No.: 16/932,371

(22) Filed: Jul. 17, 2020

(65) Prior Publication Data
US 2021/0039783 A1     Feb. 11, 2021

Related U.S. Application Data

(60) Provisional application No. 62/875,708, filed on Jul. 18, 2019.

(51) Int. Cl.
     B64D 1/10      (2006.01)
     B64C 39/02      (2023.01)

(52) U.S. Cl.
     CPC .............. B64D 1/10 (2013.01); B64C 39/024 (2013.01); *B64C 2201/128* (2013.01); *B64C 2201/14* (2013.01)

(58) Field of Classification Search
     CPC ............ B64C 39/024; B64C 2201/128; B64C 2201/14; B64C 2201/042;
(Continued)

(56) References Cited

U.S. PATENT DOCUMENTS

| D149,555 | S | * | 5/1948 | Hibbard | ................. D12/345 |
| 2,472,947 | A | * | 6/1949 | Hlobil | ................. B64C 39/02 |
| | | | | | 244/100 R |

(Continued)

FOREIGN PATENT DOCUMENTS

| DE | 202014004877 U1 | 7/2014 |
| EP | 2604519 A1 | 6/2013 |
| GB | 777593 A | 6/1956 |

OTHER PUBLICATIONS

Patent Cooperation Treaty Application No. PCT/US2018/057837, "International Search Report and the Written Opinion of the International Searching Authority", Applicant Elroy Air, Inc., dated Jan. 25, 2019.

(Continued)

*Primary Examiner* — Medhat Badawi
(74) *Attorney, Agent, or Firm* — Martensen IP; Michael C. Martensen (57) ABSTRACT

The invention relates, generally, to systems and methods for optimizing the performance of an Unmanned Aerial Vehicle (UAV) by optimizing the UAV's drivetrain, extending the UAV's battery life; by monitoring and reporting on payload imbalance or overweight conditions; and by improving the aerodynamics and streamlining of certain drag-producing elements.

14 Claims, 6 Drawing Sheets

(58) Field of Classification Search
CPC ........ B64C 2201/044; B64C 2201/104; B64C 2201/108; B64D 1/10; B64D 1/22; B64D 2027/026; Y02T 50/60

See application file for complete search history.

(56) References Cited

U.S. PATENT DOCUMENTS

| | | | | |
|---|---|---|---|---|
| 2,557,962 | A * | 6/1951 | Greene | B64C 39/02 244/36 |
| 3,028,130 | A * | 4/1962 | Burton | B64D 9/00 244/137.1 |
| 3,096,041 | A * | 7/1963 | Cheeseman | B64C 27/26 416/20 R |
| 3,149,800 | A * | 9/1964 | Sintes | B64C 3/42 244/102 R |
| 3,552,587 | A * | 1/1971 | Warren | B66C 7/00 294/81.5 |
| 3,693,910 | A * | 9/1972 | Aldi | B64C 27/30 416/143 |
| 3,778,011 | A * | 12/1973 | Cannon | B64C 27/00 D12/345 |
| 5,462,318 | A * | 10/1995 | Cooke | E05C 19/14 292/113 |
| 5,775,641 | A * | 7/1998 | Goon | B64C 1/22 89/1.801 |
| 5,820,075 | A * | 10/1998 | Speakes | B64C 1/20 224/538 |
| 5,961,071 | A * | 10/1999 | Proctor | B64D 9/00 244/118.1 |
| 6,123,495 | A * | 9/2000 | Callahan | B64F 5/50 254/323 |
| 6,293,491 | B1 * | 9/2001 | Wobben | B64D 27/24 244/17.23 |
| 6,494,404 | B1 * | 12/2002 | Meyer | B64D 25/12 244/118.6 |
| 6,622,962 | B1 * | 9/2003 | White | B64C 27/26 244/12.3 |
| 7,367,528 | B2 * | 5/2008 | Allison, Sr. | B64F 1/31 244/118.6 |
| 7,946,530 | B1 * | 5/2011 | Talmage, Jr. | B64C 39/02 244/140 |
| 8,128,026 | B2 | 3/2012 | Shelton | |
| 8,393,564 | B2 * | 3/2013 | Kroo | B64C 29/0025 244/6 |
| 8,579,234 | B2 * | 11/2013 | Thompson | B64D 1/16 239/171 |
| 8,702,036 | B2 * | 4/2014 | Curry | B64C 1/20 244/119 |
| 8,708,282 | B2 * | 4/2014 | Helou, Jr. | B64C 39/02 244/119 |
| 8,864,079 | B2 * | 10/2014 | Sankrithi | B64C 1/22 244/137.1 |
| 8,960,468 | B2 * | 2/2015 | Boivin | B65D 19/42 220/4.31 |
| 8,991,751 | B2 * | 3/2015 | Page | B64C 39/024 244/78.1 |
| 9,022,312 | B2 * | 5/2015 | Kosheleff | B64F 1/007 244/12.1 |
| 9,174,733 | B1 * | 11/2015 | Burgess | B64C 39/024 |
| 9,205,922 | B1 * | 12/2015 | Bouwer | B64C 37/02 |
| 9,223,008 | B1 * | 12/2015 | Hartman | B66C 13/085 |
| 9,499,268 | B2 * | 11/2016 | Aull | B64D 37/04 |
| 9,550,400 | B2 * | 1/2017 | Hutson | B60F 5/02 |
| 9,550,567 | B1 * | 1/2017 | Erdozain, Jr. | B64C 3/56 |
| 9,669,927 | B2 * | 6/2017 | Hodge | B64D 9/00 |
| 9,688,400 | B2 * | 6/2017 | Hutson | B60F 5/02 |
| 9,908,632 | B1 * | 3/2018 | Kimchi | B64C 27/00 |
| 9,975,633 | B1 * | 5/2018 | Johnson | B64C 3/00 |
| 10,040,553 | B2 * | 8/2018 | Frolov | B64C 39/10 |
| 10,059,426 | B2 * | 8/2018 | Flores | B64C 1/36 |
| 10,059,442 | B2 * | 8/2018 | Olm | B64C 39/024 |
| 10,479,496 | B2 * | 11/2019 | Gamble | B64C 27/30 |
| 10,640,192 | B2 * | 5/2020 | Lecerf | B64D 9/00 |
| 10,723,606 | B2 * | 7/2020 | Palomares Mora | B64F 5/10 |
| 10,894,599 | B1 * | 1/2021 | Popiks | B64C 5/02 |
| 10,902,748 | B2 * | 1/2021 | O'Hara | G09B 25/02 |
| 11,034,245 | B1 * | 6/2021 | Cottrell | B60L 53/30 |
| 11,148,852 | B2 * | 10/2021 | Weekes | B64C 39/024 |
| 11,209,836 | B1 * | 12/2021 | Sikora | G06K 9/6288 |
| 11,352,130 | B2 * | 6/2022 | Loveland | B64C 25/34 |
| 11,377,201 | B1 * | 7/2022 | Auerbach | B64C 29/0025 |
| 11,435,762 | B1 * | 9/2022 | Auerbach | G05D 1/102 |
| 2009/0014583 | A1 * | 1/2009 | Shelton | B64C 1/22 244/137.4 |
| 2011/0031355 | A1 * | 2/2011 | Alvarez Calderon F. | B64C 29/0025 244/6 |
| 2013/0020429 | A1 * | 1/2013 | Kroo | B64C 29/0025 244/6 |
| 2014/0048653 | A1 | 2/2014 | Thompson | |
| 2015/0120126 | A1 * | 4/2015 | So | G01C 21/34 701/26 |
| 2015/0136897 | A1 * | 5/2015 | Seibel | B64C 39/024 244/6 |
| 2016/0207625 | A1 * | 7/2016 | Judas | B64C 3/38 |
| 2016/0214710 | A1 * | 7/2016 | Brody | B64D 35/04 |
| 2016/0229534 | A1 * | 8/2016 | Hutson | B64C 39/024 |
| 2016/0236774 | A1 * | 8/2016 | Niedzballa | B64D 27/24 |
| 2016/0325834 | A1 * | 11/2016 | Foster | B64D 27/24 |
| 2017/0015417 | A1 * | 1/2017 | Bishop | B64C 29/04 |
| 2017/0203842 | A1 * | 7/2017 | Viaud | B64C 1/14 |
| 2017/0267345 | A1 * | 9/2017 | Marom | B64D 1/12 |
| 2017/0267347 | A1 * | 9/2017 | Rinaldi | B65D 81/3825 |
| 2017/0300065 | A1 * | 10/2017 | Douglas | B64C 29/0025 |
| 2017/0300067 | A1 * | 10/2017 | Douglas | G05D 1/0011 |
| 2017/0313421 | A1 * | 11/2017 | Gil | B65G 1/0435 |
| 2018/0305005 | A1 * | 10/2018 | Parks | B64C 27/30 |
| 2018/0362158 | A1 * | 12/2018 | Zhang | G05D 1/12 |
| 2019/0100314 | A1 * | 4/2019 | Prager | B66D 1/60 |
| 2019/0127056 | A1 * | 5/2019 | Weekes | B64C 39/12 |
| 2019/0202561 | A1 * | 7/2019 | Weekes | B64D 1/22 |
| 2019/0256202 | A1 * | 8/2019 | Resnick | B64C 39/024 |
| 2019/0352004 | A9 * | 11/2019 | Frolov | B64C 17/02 |
| 2020/0031478 | A1 * | 1/2020 | Clark | B64C 3/32 |
| 2021/0039783 | A1 * | 2/2021 | Weekes | B64D 1/22 |
| 2021/0245881 | A1 * | 8/2021 | Jarvis | B64D 1/12 |
| 2021/0362866 | A1 * | 11/2021 | Tian | B64C 11/46 |
| 2022/0063796 | A1 * | 3/2022 | Freely | B64D 31/12 |
| 2022/0090992 | A1 * | 3/2022 | Mortensen | G01N 1/16 |
| 2022/0097840 | A1 * | 3/2022 | Acikel | B64C 3/385 |

OTHER PUBLICATIONS

Patent Cooperation Treaty Application No. PCT/US2018/057837, "International Preliminary Report on Patentability" Applicant Elroy Air, Inc., dated May 7, 2020.

Patent Cooperation Treaty Application No. PCT/US2018/067020, "International Search Report and the Written Opinion of the International Searching Authority", Applicant Elroy Air, Inc., dated Mar. 18, 2019.

Patent Cooperation Treaty Application No. PCT/US2020/027846, "International Search Report and Written Opinion of the International Searching Authority", Applicant Elroy Air, Inc., dated Sep. 23, 2020.

Patent Cooperation Treaty Application No. PCT/US2018/067020, "International Preliminary Report on Patentability" Applicant Elroy Air, Inc., dated Jun. 23, 2020.

* cited by examiner

UNMANNED AERIAL VEHICLE OPTIMIZATION

RELATED APPLICATION

The present application relates to and claims the benefit of priority to U.S. Provisional Patent Application No. 62/875,708 filed Jul. 18, 2019 which is hereby incorporated by reference in its entirety for all purposes as if fully set forth herein.

BACKGROUND OF THE INVENTION

Field of the Invention

Embodiments of the present invention relate, in general, to systems and methods for optimizing the performance of an unmanned aerial vehicle and more particularly to performance optimization of payload carry and delivery by an unmanned aerial vehicle.

Relevant Background

Unmanned aerial vehicles, often referred to as drones, are well suited to applications where an aircraft would be used but the physical presence of a human operator or pilot is deprecated because of one or more factors. For example, in circumstances where a human operator would face risks that cannot be mitigated, such as flight in poor quality air or in the presence of ground hazards such as radiation or toxic emissions, it is simply more economical to use an autonomous or quasi-autonomous vehicle. One particularly critical factor is pilot exhaustion or boredom where, during a long flight in comparatively featureless conditions, a human operator becomes fatigued and falls asleep; single pilot night flight using an autopilot aid is found to be particularly risky due to the pilot's loss of situational awareness and is a significant cause of accident.

Cargo operations under single pilot conditions are hazardous because it lacks a second set of eyes and in the long-range planning process is foreseen as troublesome by the U.S. Federal Aviation Authority who have commissioned NASA studies to discover the safe limits of flight under tedious and lonely conditions. Delivery to remote and often inhospitable areas exacerbates all of these problems and is complicated by the availability of a suitable landing area. Accordingly, in many cases a fixed wing aircraft is inadequate, and helicopters are preferred. Because of their complexities, the risks with rotary winged aircraft are much higher and their operating capabilities much more limited.

Aircraft loading represents a further hazard and mishandling of cargo is an identified cause of serious mishap, usually with a fatal outcome. Helicopters have far greater operating costs than fixed wing aircraft based on their payload and are less tolerant of misloading. It is important then, that steps be taken to provide safeguards to avoid these circumstances. A UAV that is able to transition between rotary winged flight for constrained area takeoff and landing, to a fixed wing configuration provides all the benefits of providing access to difficult locations with the range performance of a fixed wing craft. However, deployed vertical thrusters rapidly become a hindrance as speed is increased due to retreating blade stall accompanied by undesirable drag forces leading to greatly reduced operational range. If the economies of a fixed wing aircraft are to be realized, then the vertical lift thrusters must be managed so that their drag contribution is reduced when operation of the UAV transitions from rotary winged flight to fixed wing flight.

It is apparent that an urgent need exists for systems and methods to transport cargo, eliminate the human operator and reduce risk whilst enabling access to sites that are very limited or inaccessible to fixed wing craft. This system for managing the performance critical factors associated with transitioning between fixed and rotary winged flight described herein enables significant economic benefits while improving efficiencies and reducing risk to human operators.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Systems herein optimize the performance of an Unmanned Aerial Vehicle (UAV) moving at high speeds. One or more embodiments of the present invention optimize the UAV drivetrain, extending battery life; monitoring and reporting on payload imbalance or overweight conditions; and improving the aerodynamics and streamlining of drag producing elements such as the vertical thruster blades and their propulsive mechanisms are described and illustrated herein.

Some embodiments of this invention comprise a drivetrain having a combustion engine coupled to a generator and an electrical distribution system, wherein the drivetrain supplies power to drive a plurality of rotors providing substantially vertical thrust and power to drive one or more propellers providing substantially horizontal thrust and wherein the power to drive the one or more propellers can be either be electrical power supplied by the distribution system or mechanical power supplied by the combustion engine.

Other embodiments of this invention comprise a detachable cargo container wherein the detachable cargo container is engaged by a retraction mechanism supplied with power from the electrical distribution system and is configured to retract the detachable cargo container toward the UAV and upon suspension of the cargo container apart from any ground contact by the retraction mechanism. In such embodiments, the retraction mechanism is configured to determine a cargo container weight metric and cargo container balance metric and responsive to the cargo container weight metric and cargo container balance metric meeting a predetermined weight criteria and a predetermined balance criteria, the retraction mechanism couples the detachable cargo container to the UAV.

In other embodiments, a combustion engine drives the generator to produce electrical power to be supplied to the electrical distribution system and/or drives the one or more propellers to provide substantially horizontal thrust.

Another embodiment comprises a rotor storage mechanism configured to shroud each of the plurality of rotors responsive to the UAV achieving horizonal flight independent of vertical thrust rotors.

Yet other embodiments comprise a processor wherein the processor executes instructions to perform a method for flight parameter balancing, comprising, calculating necessary fuel weight requirements to fulfill a cargo delivery mission, receiving the cargo container weight metric and the cargo container balance metric from the retraction mechanism determining a maximum UAV takeoff weight and a maximum cargo container weight, and determining for an entirety of the cargo delivery mechanism whether the UAV will remain within the predetermined weight criteria and the predetermined balance criteria.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Overview

Embodiments of the present invention optimize the performance of an Unmanned Aerial Vehicle (UAV) by optimizing the UAV drivetrain, extending the UAV's battery life; by monitoring and reporting on payload imbalance or overweight conditions; and by improving the aerodynamics and streamlining of certain drag-producing elements.

Assumptions and General Terms

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Winch

One embodiment of the present invention engages and retrieves a cargo container for subsequent transport using a UAV. To do so the contents that lie within the container must fall within a prescribed/predetermined operating limitations of the transporting craft as well as the systems and methods for autonomous collection and depositing of such a cargo pod or container.

One aspect of the present invention for enabling automated or semi-automated cargo collection is that the cargo be packaged within the container in a format that enables flight operations. This is exemplified in the everyday multi-modal transportation industry where standardized shipping containers are packed and then collected and delivered by truck and boat. Standardizing packing conventions enables transporters to focus solely on proper stacking of fixed-dimension "blocks" of containers. The requirement for standardized containerization is also seen in the air cargo businesses where fixed format pods are loaded into pre-designated spaces on board a transport category aircraft. Whereas these prior examples all require semi-automated handling at the very least, the container or pod of the present invention automatically necessitates compliance with strict loading limits once a pod is charged with its cargo.

According to one embodiment of the present invention the retrieval or pickup mechanisms of the cargo pod located at the aircraft not only couple automatically to the pod, but also determine whether the loading schedule for the pod is within pre-established limits prior to hard docking the pod to the craft. Further, should a pod fall outside the pre-established limits and is rejected for flight the pod is returned to its original location for re-packing and released efficiently. The location and communication system of the present invention equip the aircraft for finding and delivering the cargo pod to and from predetermined regions.

In one embodiment of the present invention, once a pod is located, the aircraft moves to a point above the pod. A winch system lowers a coupling mechanism until it is within the coupling range of the container and an extensible grasping mechanism engages with load-bearing pickup points on the container. Upon achieving a positive lock onto the container, a winch system begins to retract the container toward the underside of the aircraft. As the container is raised the loads exerted on the airframe through the winching system are monitored to determine if the loading profile is within the performance envelope and/or currently assigned mission profile of the aircraft. This loading measurement can be done both directly and indirectly so that a single point failure does not disable the operation, nor render it unsafe. If the loading profile is deemed satisfactory, the winch continues the retraction process and the container is lifted into close engagement with the aircraft. Once this position is reached, separate positive-locking mechanisms couple mating hard points on the container to the aircraft. At this point, the winch mechanism is de-energized. In another embodiment the winding mechanism remains coupled to the container but in a dormant state providing redundant securement and preventing un-commanded release of the container.

Figure 1A:
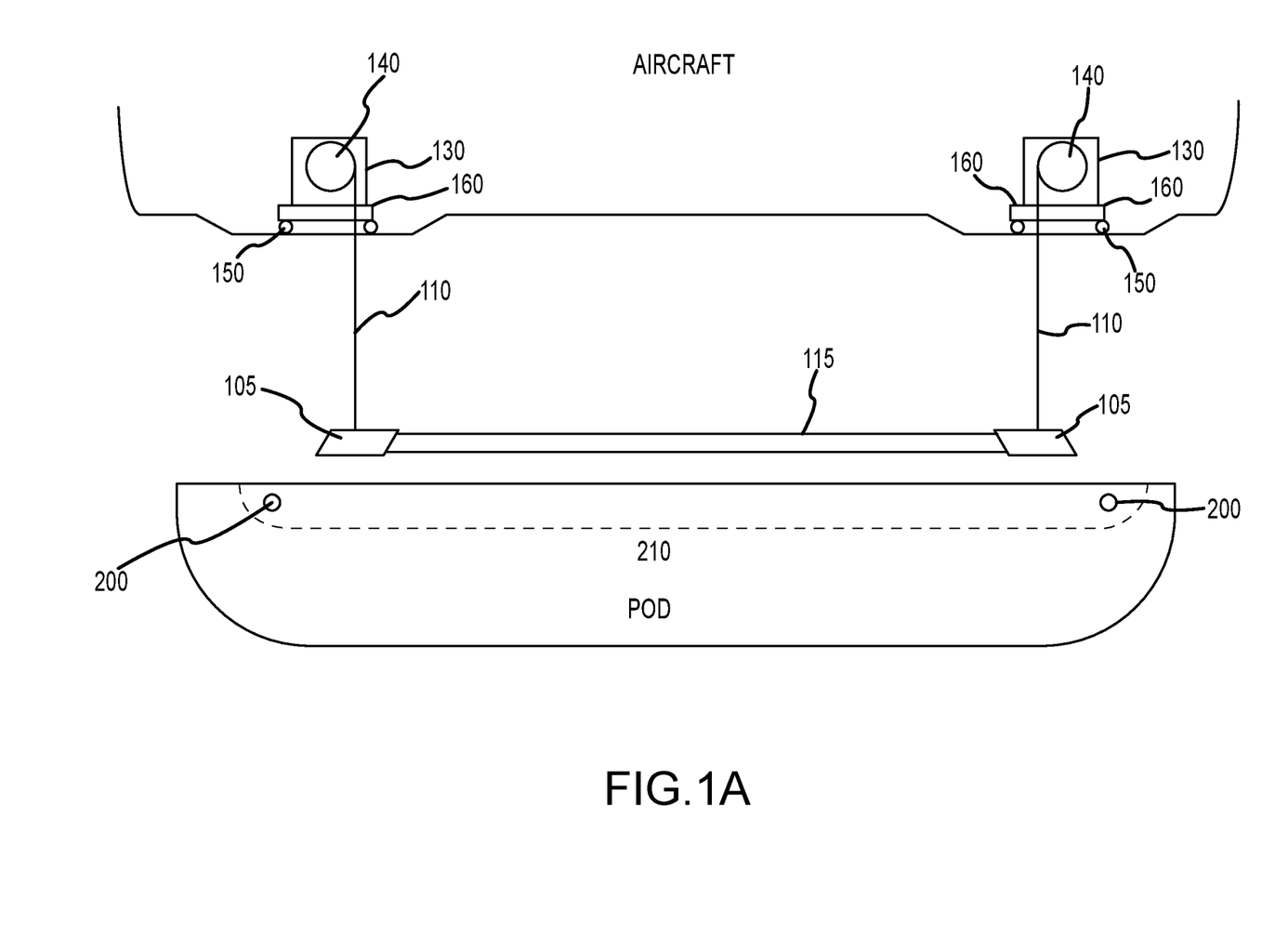
FIG. 1A shows a side view of the pod-to-aircraft coupling mechanism and winch system.

The coupling mechanism that allows an automated connection to be made between the aircraft and the cargo container or pod is illustrated in FIG. 1A. A coupling latch fastens to either end of an extensible beam assembly which is comprised of two interleaving components. The coupling latches 105 are coupled to winch cables 110 and bear the lifting forces exerted by the aircraft on the pod during the hoisting or lowering part of the loading operation; it should be noted that synthetic straps or cables may be used according to the application, especially if employed in a corrosive environment, as may be experienced when operating in coastal areas. In the embodiment shown in FIG. 1 the inner beam component 115 is a square or rectangular section tube with a threaded nut secured at the inner end, through which a jackscrew is fitted. The outer beam component is a matching square or rectangular section tube that is a sliding fit over the beam component 115 so that, absent any retaining components, the inner beam 115 slides easily inside the outer beam. The jackscrew is controlled by a motor and rotating the jackscrew causes the inner beam 115 to be retracted into or extended out from the outer beam.

In one embodiment, the coupling mechanism may determine its seat on the payload volume either from a motion of extending outward in a vector roughly parallel with the vehicle's centerline, or from a motion of contracting inward also along a roughly parallel axis. In both cases, the coupling mechanism descends towards the top of the payload container from above, then when appropriately positioned, commences said extension or contraction.

In another embodiment, upon first contact with the container, the coupling mechanism is assumed to have a high degree of misalignment with the centerline of the payload container. As the coupling mechanism extends or contracts, the coupling heads contact guidance features. As the coupling heads continue their motion, the guidance features shepherd the coupling ends to "homes" which seat the coupling mechanisms to the correct structural tie point located on the centerline of the pod and on or around the top surface of the payload container.

Once seated in the homes, the payload container is ready for the lifting sequence. On lifting, the dangling condition of the pod brings the pod+grasping mechanism unit into natural alignment with the structural tie-points within the fuselage of the aircraft.

A simple seal seals the assembly to limit the ingress of particulates, dust or dirt that would risk binding or jamming the assembly so that it was no longer able to move freely along its length; a soft felt material or a silicone rubber gasket or similar system fulfills this requirement. A motor is used to rotate the jack-screw to extend or retract the coupling latches so that they engage with hard points on the cargo pod. In one embodiment, the beam is simply retracted or extended to a known position which is defined by a physical stop. A change in motor current is used to sense this position and shut off power to the motor to prevent any damage to the motor or drive components.

In a second embodiment, the position of the beam components is determined by one or more switches that set the maximum retraction or extension. In yet another embodiment, a stepper motor controls the extension or retraction distances by counting the number of rotations that the jack-screw makes and its proxy, the number of pulses supplied to the stepper motor.

Motor power can be provided by a retractable cable that is wound in concert with the winch cables 110. In one embodiment, a battery pack with an associated controller is fitted alongside the motor within the beam that supports the coupling mechanism. Operation is signaled by a wireless data link. Here, since the aircraft is able to determine its position in all three axes relative to the pod, once the winch mechanism has lowered the grasping assembly to the level of the pod, then a signal to extend the grasping beam to a predetermined length. This position is unchanged until the aircraft deposits the cargo pod in its new location, whereupon the grasping beam is retracted, and the winch recovers it to an aircraft storage area. The battery is charged whenever the beam assembly is retracted into the aircraft and this may be accomplished in any of the ways known to one ordinarily skilled in the art. In general, a non-contact wireless charging system is preferred because of its immunity to the ingress of dirt or dust, or the breakage risk that attends a cable that is constantly extended and retracted.

When the grasping mechanism is lowered from the aircraft, there can be some uncertainty about its position relative to the pod hard points with which it engages. by small location errors in positioning the aircraft relative to the container or pod. Typically, local turbulence may deflect the grasping mechanism so that it lies improperly aligned, with the receiving latches offset from the attachment points. The latching points are combined with a guiding structure inset to a depression in the upper part of the pod, so that once the grasping mechanism is in approximately the right position in the depression, extension of the beam 115 will push the ends, to which the receiving latches, so that they slide, guided by the curvature of the hard point structures until they engage with the mating points approximately at the midpoint of the hard point structures. In one embodiment, the outer beam is fitted with a cross piece that resists any tendency of the grasping mechanism to roll over to one side once the connecting straps or cables go slack as the beam stops descending upon contact with the pod. In a second embodiment, the depression in the top surface of the pod is contoured so as to cause the grasping mechanism to slide down into the lowest point so that it is aligned with the hard points; because the pod is manufactured using composite technologies, complex curvatures are already used to embed strength into the structure and the formation of suitable profiles during the manufacturing process is not economically disadvantageous. Once the grasping mechanism is extended into the coupling position, the hoisting action causes the hard points to be firmly coupled into the latches.

Figure 1B:
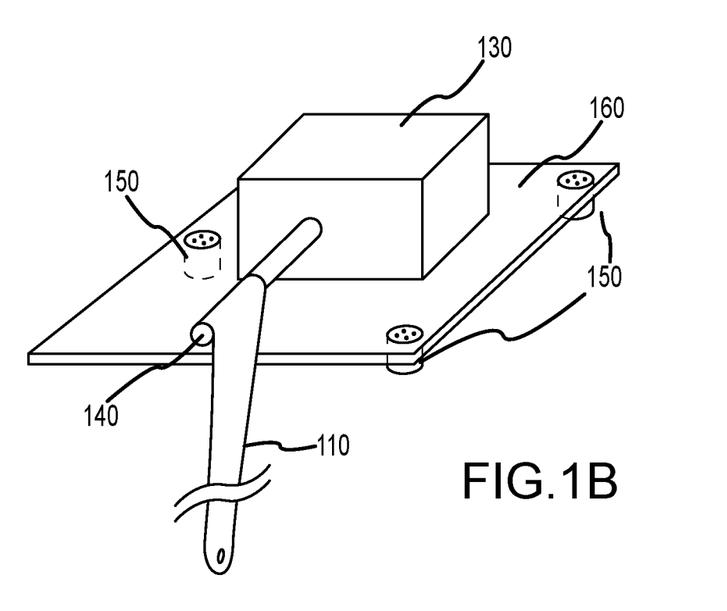
FIG. 1B shows a perspective view of the detail of the winch motor and gearbox assembly.

The winching or hoisting mechanism 130 is located in the aircraft fuselage. Traditionally, the windlasses about which cable 110 or straps are wound are mechanically synchronized so that the retraction rate is in a fixed ratio (for level hoisting the ratio is 1:1) but in this case, the ratio can be managed by controlling the operation of each winding mechanism directly. FIGS. 1A and 1B illustrates an exemplary winch system. The grasping mechanism and its relationship to the coupling hard points are described above and reference may be made to FIGS. 1A and 1B for comparison. The depression in the upper surface of the pod into which the coupling hard points are inset is shown as a dotted line region. Cables or straps 110 are attached to windlass drums 140. These are coupled to a drive system comprised of a gearbox and an electric motor. In one embodiment, a chain and sprocket system achieve a speed reduction between the motor and the drum. The electric motors are preferably controlled by an electronic controller that ensures that the hoisting ratio between the windlasses is maintained.

The winch system of the present invention includes force transducers/load cells 150 that serve to determine the overall weight of the container, and its balance. If the determined weight is too high for the UAV, or the container is too unbalanced, an error condition (signal) is generated, and the UAV ceases its attempt to grasp the container. One benefit of this sensor winch system is UAV safety. Attempting to lift a container that is too heavy could cause a failed liftoff. Carrying an unbalanced container could cause poor aerodynamics, shortening range or inflight mishap.

In one implementation two windlasses are used, but in a second embodiment more than two windlasses are used. The tension in the strap or cable 110 allows the weight and center of gravity of the cargo pod to be ascertained. Simply, the weight is the sum of the tensions; the center of gravity can be calculated since the product of the tension multiplied by the distance of the point of application of this force from the center of gravity (CoG) for one lifting point is equal to the same calculation for the other lifting point. Since the performance envelope for the aircraft defines the range of acceptable CoG positions, the loading performance for the cargo pod can be calculated as soon as the pod is entirely supported by the winching mechanism. The calculation is replicated for as many lifting points as needed knowing that the sum of clockwise moments is equal to the sum of anti-clockwise moments, taken about the position of the CoG. Knowing the distance, the UAV must travel to affect delivery, fuel requirements and the like, the system can determine if the weight and CoG of the pod are within both aircraft limits for general flight as well as within operational limits. As one of reasonable skill in the relevant art will appreciate, long range transportation may require additional fuel or because of high terrain require the UAV to obtain a higher than normal route altitude. These factors can be immediately considered upon retrieving of the pod to determine if pod loading and CoG are within acceptable limits.

The lifting forces for each strap or cable 110 can be measured either directly or indirectly. Load cells measure the load supported by the aircraft for each windlass which is equal to the tension in the cable. In one embodiment, cable tension is measured by a tensiometer through which the cable is routed. In a second embodiment, the windlass drum is coupled to the driving assembly using a torque meter and this meter calibrated directly in load; note that because a strap or cable is wound over the prior layer on the drum, the calculation using a torque meter requires that the angle of rotation completed during the winding process be measured and the effective radius at any angle be established. The current applied to the motor is a measure of torque or winding force produced by the motor and is related to the tension in the cable. In yet another implementation, such motor power-related computation is used to determine the load on the strap or cable. In a further embodiment, the lifting performance of the aircraft is related to load being lifted and the power applied to each rotor is used as a determinant of the load being lifted; Using this as a basis for calculation needs an accurate relative altitude measure and so a radar altimetry solution can be used. The positioning system used for locating the pod may also be used as an altitude reference provided that any correction factors are provided by a fixed wide area augmentation system if a satellite reference is used, so that propagation variations may be compensated.

FIG. 1B illustrates a system, according to another embodiment that uses two or more load cells to support each windlass assembly. Here, the windlass 140 is shown as a spindle for simplicity of illustration. Motor and gearbox assembly 130 is shown as a single component integral to the spindle fastened to a supporting plate 160. In this exemplary illustration, three load cells 150 are used and the total force exerted on the strap 110 determined from the loads on each cell. In another embodiment, the spindle is supported by an outer bearing secured to the plate using a bracket and the strap run through a slot cut out of the plate; this has the advantage that the entire load path is no longer through the motor and gear box but in proportion to the strap position relative to the inner and outer bearings. In yet another embodiment, the spindle or a drum is supported in two load bearing elements such as ball bearings or roller bearings within a bracket attached to the support plate and the motor and gearbox assembly reacts only the torque applied to the winding shaft.

Figure 2:
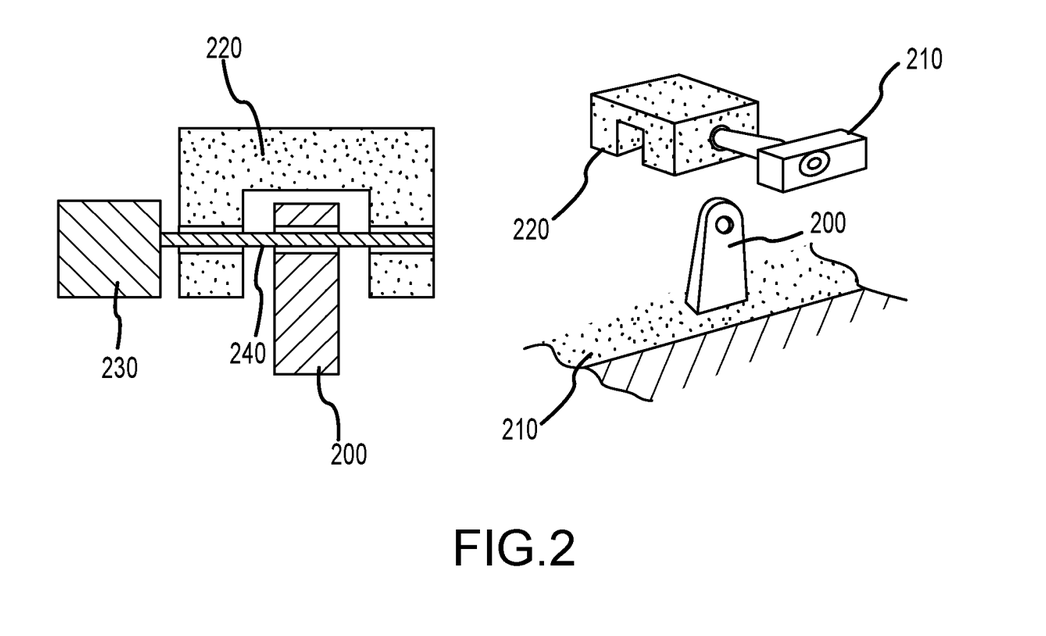
FIG. 2 shows a cross-section view of the independent securing system (left drawing) as well as perspective view of the same (right drawing)

Once a cargo pod has been raised into the transport position beneath or within the fuselage of the aircraft, then it is secured to prevent inadvertent or untimely release. The grasping mechanism can remain firmly attached and its accompanying hoisting cables or straps kept under tension, but a second securing mechanism ensures the security of the pod is not determined by a single point of failure; for example, a chafed hoisting strap may fail under loads resulting from turbulent flight. Accordingly, an independent securing system is provided and is illustrated in FIG. 2. One or more hard points 200 are located in predetermined positions on the cargo pod 210. A matching number of mating coupling assemblies 220 are attached to the aircraft fuselage. When the cargo pod is hoisted into the transport position then the hard points 200 are guided into alignment with the coupling assemblies 220. A drive motor 230 feeds a locking pin 240 through the coupling assembly, then a matching hole in the hard point 200 and finally into the opposite side of the coupling assembly. If the tension in the hoisting straps or cables are now relaxed, then the entire load of the cargo pod is supported by the locking pins 240 securing the pod 210 to the aircraft. Prior to unloading the cargo pod during delivery to the destination, the winching system tensions the cables and, once this has occurred, each locking pin is withdrawn into the side of the coupling assembly 220 leaving the hard point 200 free to move and depart from engagement with the aircraft. The winching system may now lower the pod until the tension on the straps or cables is relaxed upon surface contact, the grasping mechanism retracted and then pulled up into the aircraft so that the next operation can be commenced.

Drivetrain

In another embodiment, the UAV is comprised of a body or fuselage that contains electrical power storage in the form of batteries, electronic equipment such as computing and battery management systems, and fuel used to power an internal combustion engine secured to the rear of the body which is equipped with a propeller to produce forward thrust, and a generator to supply electrical power for use by vertical thrusters.

Two wing assemblies, a main plane and a canard front surface provide sustaining lift in fast forward flight, connect the fuselage to two booms, one either side of the fuselage, which house electric motors coupled to rotors or propellers that provide lifting thrust for the UAV.

In one embodiment (the "mid-mounted embodiment"), the main plane is a mid-mounted surface which provides lift in forward flight and the aft plane, connected by the fuselage, is a stabilizing tail. A plurality of booms on the main plane mount one or more electric motors, coupled with rotors or propellers, per boom. Each propeller provides lifting thrust for the UAV. In this embodiment, the forward plurality of propellers may be mounted below each boom instead of above.

Conventional UAV structures that are capable of vertical takeoff and landing have mostly used four or more vertical thrust units located on pylons attached to the central body of the aircraft. In these systems, unlike the systems in a helicopter that use articulating rotor heads and blades, movement laterally can be accomplished by applying excess thrust to one or more vertical thrusters so as to cause the entire body to tilt, which provides a component of the lifting force horizontally and causes forward, backward or lateral motion. The slight reduction in available lift is compensated for by simply matching the delivered thrust to restore the vertical component to that which maintained level flight. The rate of translation of the entire vehicle is set by the angle that the rotors or propellers make with the horizontal plane or plane of motion with a greater angle associated with greater speed.

In an exemplary embodiment of the present invention, the vertical thrust vector is fixed in relation to the boom structures which hold the thruster units. The vertical thrusters in this example are electric motors which are coupled to a fixed pitch propeller. For simplicity, a two bladed propeller design is used, and this removes any of the complexity that results from articulation mechanisms. The thrusters are responsible for the development of vertical lift when the aircraft is stationary, horizontally, but can provide local maneuvering movement for positioning purposes in the same way as conventional, rotor-only UAVs. The thrusters are responsible for the development of vertical lift when the aircraft is either stationary or horizontally in flight and can provide local maneuvering movement for positioning purposes.

Forward thrust is provided by the main powerplant and thrust mechanism located at the rear of the fuselage and as the aircraft's speed increases, lift generated by the two wing surfaces increases until the force from the vertical thrusters is completely replaced by that lift from the wings. During this transition, the vertical thrust from rotors can be diminished under computer control until it is no longer required for the UAV to maintain level or climbing flight.

In the mid-mounted embodiment, instead of or in conjunction with a main forward thruster, a plurality of thrust mechanisms is mounted laterally across the surface of the wing.

Once vertical thrust is no longer required, the vertical thrusters may be halted and the power supply system, comprised of a battery assembly with its associated battery management system, set to recharge in anticipation of the next use. Aircraft thrust in the conventional fixed wing mode is provided by the main powerplant and its coupled propeller. A generator system provides electrical power used to recharge the high current batteries used for the vertical takeoff and landing phases of flight as well as incidental power for the computing equipment that controls the vehicle and provides for navigation and communication functions.

A system of gears and clutches permits the propeller to be decoupled from the engine itself while the generator system remains functional. This permits the aircraft to slow to a speed where the rotors of the vertical thrusters can be used so that the UAV can operate below the speed at which the wings system provides sustaining lift for flight.

In hovering flight, it is preferable but not necessary that the primary powerplant or engine continues to run so as to provide enough electrical power to ensure that the intended operation can be completed without interruption. To be effective, horizontal thrust is removed by allowing the propeller to coast or freely rotate so that the UAV does not have to counter this force using thrust vectored from the vertical thrusters. This decoupling of the main thrust propeller reduces the chance of a propeller strike which is typically ruinous for the propeller, gearbox or coupling assembly and engine.

Figure 3:
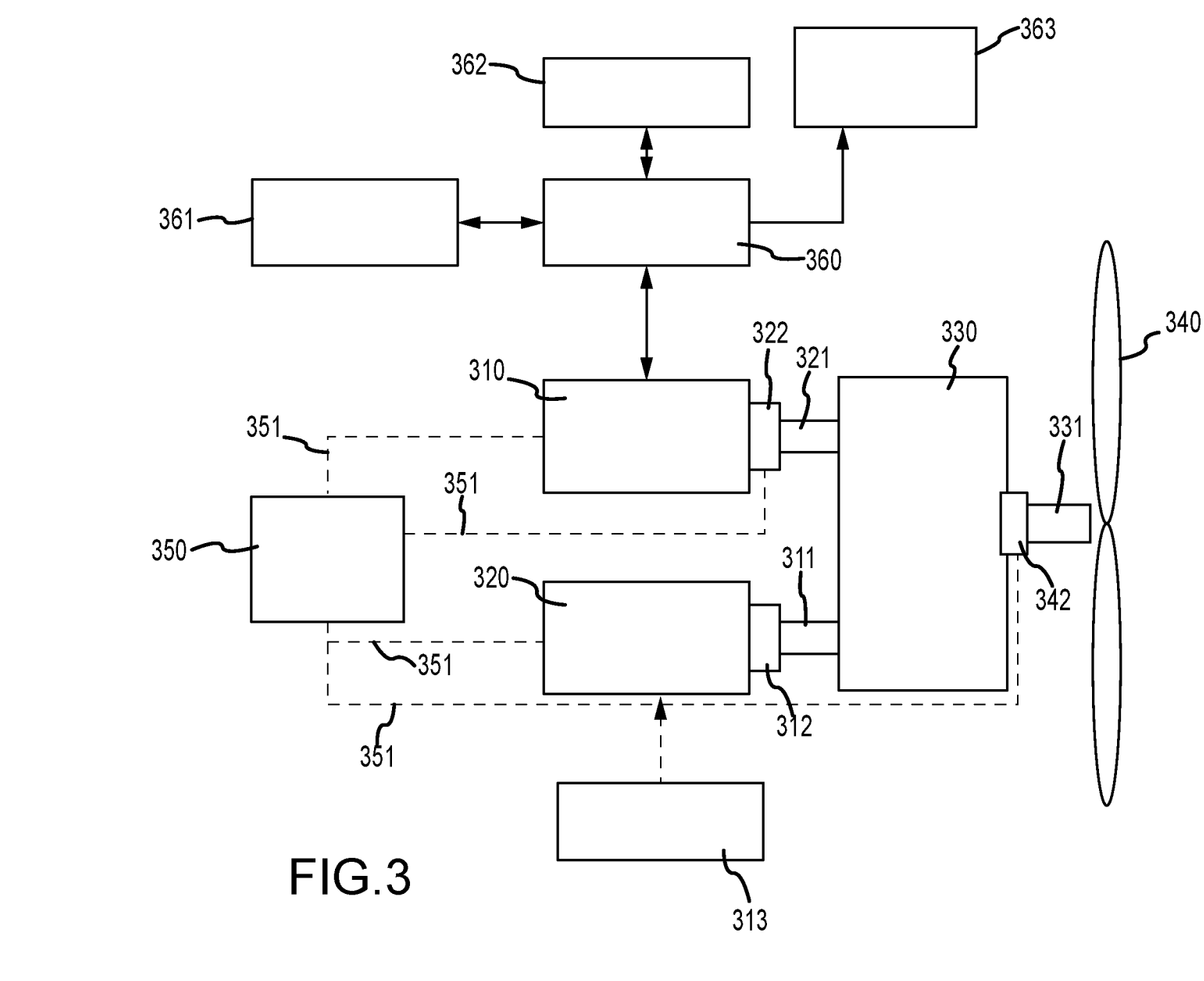
FIG. 3 shows a schematic view of the parallel hybrid system.

One optimization of the UAV system of the present invention addresses the configuration of the drivetrain. One embodiment of the drivetrain for the UAV is shown in FIG. 3. A parallel hybrid system 300 is shown with an engine 320 and motor/generator 310 arranged in parallel. Both of these power generating systems connect with a gearbox 330, which thereafter connects with a propeller.

The system, in this embodiment uses at two or more clutches 342, 322, 312, one between the gearbox 330 and propeller 340, and another between the gearbox 330 and motor/generator 312 and engine 320. The flight control system (FCS) is configured to independently engage or disengage these clutches as required.

In this embodiment, the motor/generator 310 has a bidirectional connection to a power distribution system (PDS) 360 which handles the transfer of electrical power among a battery 362, the rotors 363, and a thermal management system 361 (TMS).

The UAV of the present invention is capable of multiple different modes of movement: parking, taxiing, flying, ascending, descending. The UAV's drivetrain system operates in a different optimized way depending on these modes and depending on other factors.

For example, during parking and ground operations, the UAV's FCS disconnects the propeller and secures it in a safe position. It does so by sending an instruction to an actuator within the propeller's clutch, which acts to disconnect the propeller from the gearbox, which then stops. This stopping creates a safe ground environment. While the propeller is disengaged the drive system may continue to operate the engine to provide electrical power, should battery power be insufficient.

Similarly, while parked, the UAV's engine can be running, and charging the battery via the gearbox, motor/generator and PDS. Alternatively, or in combination with the engine, the PDS can receive power from a mains connection while on the ground, and thereby power the battery and TMS.

While taxiing and certainly flying, the FCS ensures that the propeller's clutch is engaged so that the propeller is operating. The system drives propeller operation either by the engine or by the motor/generator, or by both in combination.

While ascending during takeoff, the UAV's VTOL mode of operation is employed. In this mode, the FCS ensures that the propeller's clutch is disengaged yet allowing the propeller to freely rotate to minimize drag. Further, the system drives the rotors, through the PDS, either by the engine-generator, by the battery, or by both in combination.

While descending from cruise altitude to final approach, the descent may be gradual. In this mode, the system idles the engine and allows the propeller to rotate naturally due to the external force of the air reducing parasitic drag. In this mode of operation, the naturally rotating propeller can drive the gearbox to recharge the battery through the PDS. A one-way bearing between the engine and gearbox prevents the engine from running backwards during this battery recharging.

While descending from final approach to the ground, the descent is effectively vertical, though not necessarily absolutely so. In this mode, the FCS disconnects the propeller, and the PDS drives the rotors. Operation of the rotors is driven either by the engine-generator, by the battery, or by both in combination.

From the foregoing, it is seen that the battery is charged in multiple modes of operation. First, while the UAV parked on the ground, a mains connection to the PDS can provide the charging. Second, in all modes of movement, the running engine can serve to charge the battery, via the gearbox and PDS. Third, during descent from cruise to final approach, the wind milling propeller serves to charge the battery via the gearbox and PDS.

The UAV powertrain of the present invention allows the system to use a lighter, smaller, cheaper battery. This is because the system can be configured so that the battery is not driving the propeller. The parallel system of the current design is 10-20% more efficient than series for engine & motor configuration and can address engine failure or electrical system failure. That is, either system could fail, and the other would continue to work to handle a safe descent.

Lastly, with the propeller disconnected, the engine can be run safely while UAV is parked or during ground operations. Yet the running engine can continue to power the thermal management system and charge the batteries.

With respect to the thermal management system of the present invention, performance of batteries is comprised when they are exposed to extreme temperatures. Given that UAVs in the field could sit on a tarmac for extended periods of time—across wide temperature ranges—the need arises for a thermal management system ("TMS") for the UAV battery.

In addition, icy conditions can significantly harm operation of the rotors and interfere with the UAV electrical system. For these reasons as well, the UAV of the present invention incorporates a TMS.

The TMS is powered either by the engine-generator, by the battery, or by some combination of both, and, while the UAV is parked, by a mains connection to the PDS. The TMS of this invention provides a number of benefits. The TMS extends the life of the battery by keeping the battery at optimal temperatures while in flight and on the ground. It also enables using a smaller, lighter, cheaper battery. This is because, absent a TMS such as the one described, the battery will become hot at times, decreasing its performance efficiency. Hence, a larger, heavier, and most costly battery will be needed to achieve the same performance. And the TMS saves the UAV from using air to cool the battery. An air-cooled system harms aerodynamic performance while the TMS of the present invention improves performance.

Rotor Locking and Storage

Another aspect of the present invention is a mechanism for enclosing the vertical thrusters (rotors) when they are not in use, thereby reducing the drag and undesirable aerodynamic effects that result from their exposure.

The two major effects of a rotary wing are the drag due to the hub that secures the wing roots and the significant rolling moment that occurs with the retreating blade as it approaches the stall. This latter effect is directly related to the blade articulation to balance the lift on both sides of the rotary wing as the angle of attack of each is modified during rotation to maintain equal forces on either side. Drag is induced as a consequence of lift being produced that creates an undesirable pay effect and the cost of drag, regardless of source, is far greater power being required to sustain flight. Note that the power required varies as to the cube of airspeed, as a good approximation.

Once the vertical thrusters have been slowed to a halt, the position of the blades is likely to be indeterminate. Indeed, forces acting on the blades in normal flight in atmospheric air may cause them to wander in position, which is undesirable. To minimize drag, the rotor positions can be indexed by the thruster motor so that they are aligned fore and aft along the boom in line with the airflow.

Once so aligned, the rotor may be held in position by either locking the motor electrically or using a mechanical lock. To lock an electric motor such as a permanent magnet brushless motor, the simple expedient of short circuiting the stator coils is often sufficient; any turning motion is resisted by the generation of a current in these coils that creates a magnetic field that counters the motion and, provided no great force is applied, the motor will not move any significant amount.

Because the propeller structures that constitute the rotor of the vertical thrusters protrude into the airflow over the top of the boom, turbulence is created. This manifests itself as drag. Reducing this turbulent flow, and thereby drag, improves performance and range. Even a simple deflector, resembling the windshield seen on a motorcycle will significantly improve the performance of the aircraft, but such a solution is less effective as speeds increase.

Therefore, one embodiment of the present invention as shown in FIGS. 4A-4C and FIG. 5, employs a system so as to more fully cover the stationary blades. Once the thruster blades 401 are aligned with the long axis of the boom 405, a set of clamshell doors 410 is displaced from the resting position nestled snugly to the boom and raised until the tops of these doors are sufficiently above the level of the propeller 401 and then they are closed so as to substantially encase it.

In the mid-mounted embodiment, each of the propellers may be stored in its respective boom along the wing The propellers may still be enclosed within clamshell doors and the booms may be raised and lowered such that the propellers are stored within the booms.

In its simplest form the doors 410 create a tunnel open to the airflow at both ends. In one embodiment of the present invention a supplementary fairing 510 is raised from the front of the boom 405 to reduce this effect. Although a similar device can be deployed so that the tunnel formed by the clamshell doors 410 can be closed off to airflow at both ends, the gain in efficiency is usually minimal and in most instances the rear end can be allowed to remain open to the air with the turbulent flow at this point managed by using flow straighteners at the rear of the boom.

Figure 4A:
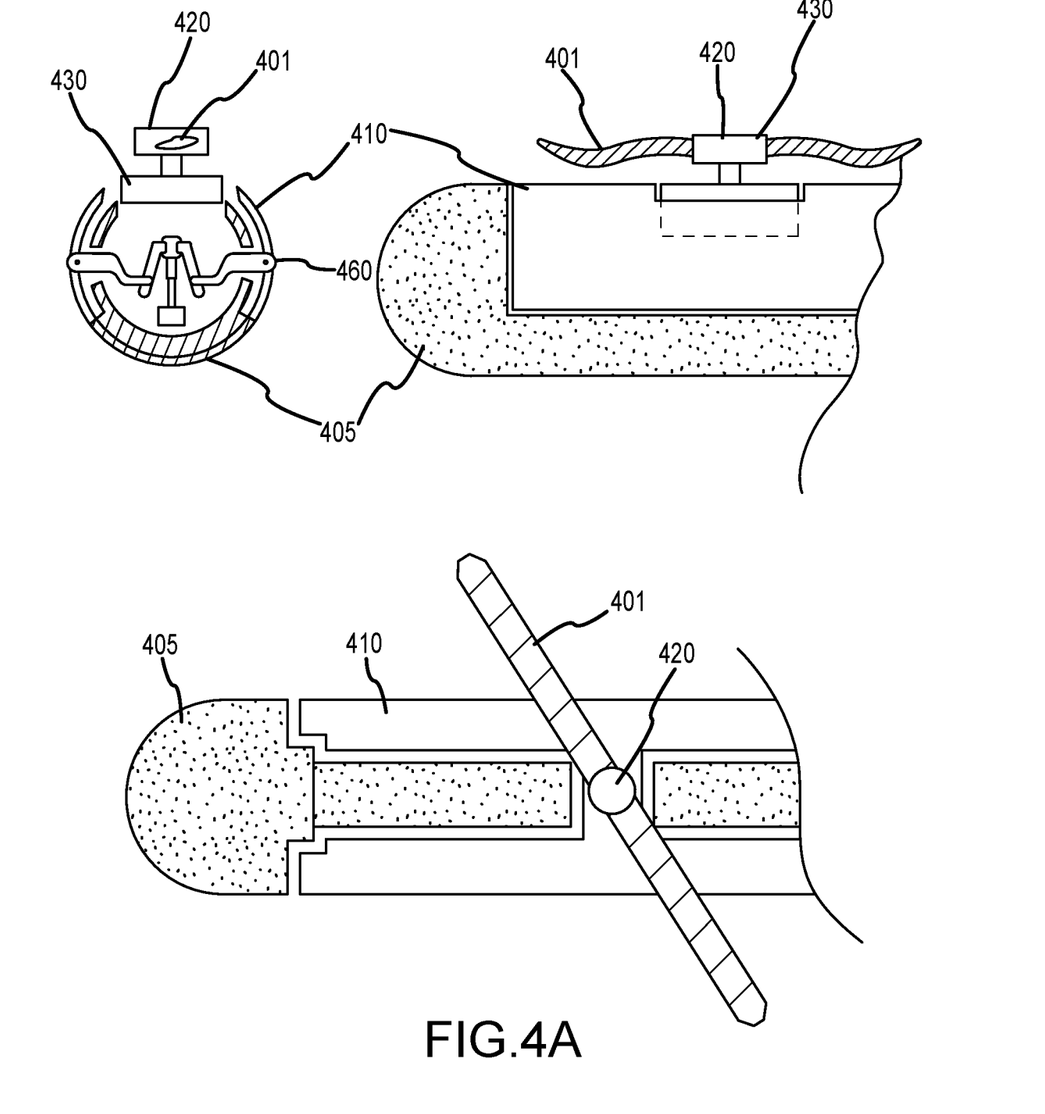
FIG. 4A shows a cross-section view of the clamshell shroud system (top, left), as well as a side view (top, right) and top view (bottom) of the same.
Figure 4B:
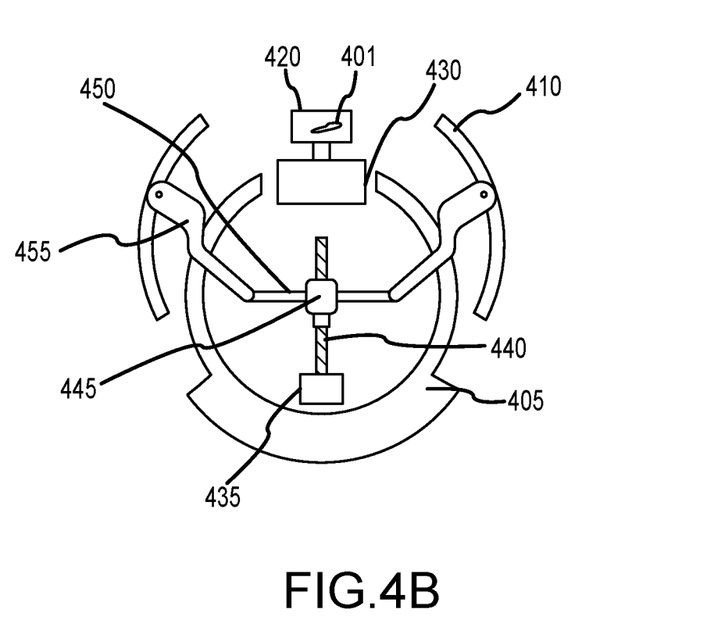
FIG. 4B shows a cross-section view of the clamshell shroud system extending.
Figure 4C:
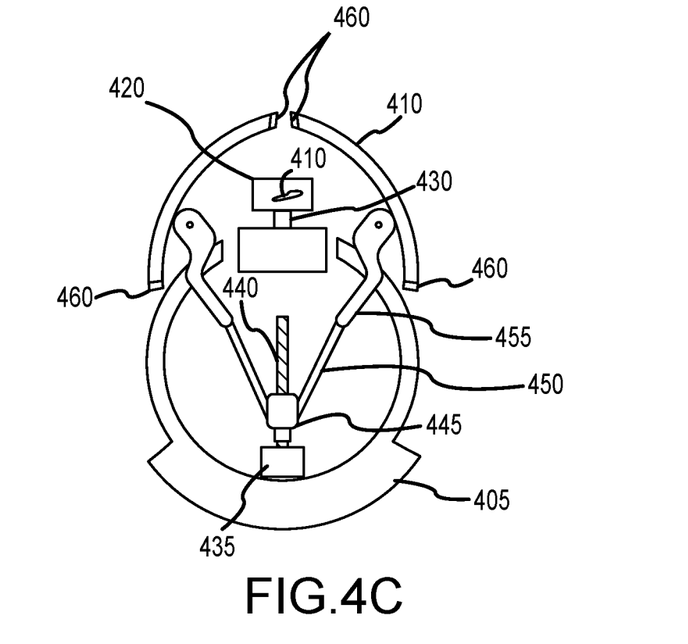
FIG. 4C shows a cross-section view of the clamshell shroud system closed over the propellers, in the fully-shrouded position.

FIGS. 4A, 4B and 4C show a representation of the boom assembly that houses the vertical thrusters. In the figures, only a single thruster assembly is shown to aid in clarity. FIG. 4A shows a cross-sectional side and top view of one boom 405 assembly. The primary structure of the boom 405 is secured to the fuselage by the wings of the aircraft and any supplementary structures such as wires or bracing structures can be enclosed in aerodynamically shaped fairings 410.

Clamshell doors 410 are shown in the retracted or stowed position in FIG. 4A, fitted snugly against the primary structure 405. Because this is the position for the lifting rotors to operate, the doors 410 are fitted in such a way as to preclude the downwash forces created by the rotors or propellers from displacing the doors.

The rotor or propeller 401 is connected to a hub 420 and the hub firmly coupled to an electric motor 430 so as to resist any movement relative to the motor shaft. Enclosed within the boom is a mechanism 460 that displaces the doors 410 outward and upwards until they reach above the top of the rotor or propeller 401 before closing them firmly so as to shroud the vertical thrust mechanism from airflow.

The plan view from above that shows the primary structure of the boom extending all the way along the top of the boom with cut-outs formed for the drive motor coupling to the propeller to extend out of the boom. It should be observed that the clamshell doors 410 are not a structural part of the boom assembly, but a movable fairing that serves to cover the vertical thrust components from precipitation and dirt as well as serving as an aerodynamic improvement during flight.

One problem that is of great concern for rotating machinery is the effect of imbalanced forces. Although we can achieve excellent dynamic balance in the vertical thrust sub-assembly comprised of the propeller, hub and motor, flight conditions often impose conditions that can lead to destruction of these parts. A particular concern is the effect of ice, the accretion of which can be pernicious and extreme.

For example, if the thruster is stowed while wet, continued ascent may place the UAV in an environment below freezing. At this point, the liquid water will form ice and if not removed prior to engagement of the rotor the out-of-balance forces may significantly damage the rotor/motor assembly. Further, the ice formed is likely to be clear ice, as opposed to rime ice, which is dense (heavy) and tenacious. According to one embodiment of the present invention, heat energy produced by the equipment (engine and batteries) can be directed into the shroud formed by the clamshell doors to raise and maintain the temperature of the vertical thrust elements comfortably above freezing.

FIGS. 4B and 4C provide additional detail with respect to the shroud mechanism of the present invention. Actuator 435 rotates a jackscrew 440 which pulls a matching threaded collar 445 downwards. This motion displaces the coupling arms 450 that push the door arms 455 that connect to the doors 410 outwards. The doors 410 are pushed away from the boom 405 and displaced upwards. A simple spring mechanism located at the point where the doors 410 and their door arms 455 are connected and operates so as to bias the doors 410 to hold the upper parts away from the boom structure so that they are held open. The lower edges of the doors will tend to remain close to or in contact with the boom structure and in one embodiment rubbing strips are used to prevent wear between the lower edges of the doors and the boom structure itself.

As the jack-screw 440 continues to be turned by the actuator 435, the collar 445 continues to move down and will cause the doors to be drawn closer to the centerline of the boom 405 until they are drawn snugly against their partner door thus enclosing the vertical thrust components, the motor 436, the propeller hub 420 and the propeller blades 410. The door arms 455 are guided by slots or tracks in the boom structure where they penetrate it and the coupling arms 450 may have machined features that limit the displacement between these two joined parts to create the actuation geometry required.

The curvature of the doors 410 is selected so as to ensure that, in the shroud position where they cover the vertical thrust components, a good fit is available. In the retracted position, it is important that the doors 410 are a snug fit to the boom 405 and cosmetic features may be added to the boom structure so as to limit the force of the downwash air from the vertical thrusters to prevent the clamshell doors 410 from being forced away from the boom structure.

FIG. 4C shows the doors 410 in the fully shrouded position, covering the entire vertical thruster system for that boom. Here, the actuator 435 has wound the collar 445 to its limit and the arms 450 and 455 have in combination displaced the clamshell doors 410 so that they are in contact with each other at the top of the doors and each presses against the boom 405 at their lower edges.

In one embodiment, the edges are tipped with a compliant seal 460 for the upper and lower edges and in a second embodiment either or both of these seals are pneumatically inflatable to ensure a good seal along their entire length. Inflation can be done using a small pneumatic pump as is common with small general aviation craft that use inflatable seals to minimize wind noise and leakage between the passenger enclosure and the ambient air.

In another version of the present invention a small radiator or heat exchanger is installed within the boom structure to maintain the temperature within the enclosure formed when the clamshell doors are in the fully shrouded position. A small fan can be used to circulate the air and a system of ducts can be fabricated in the structure of the boom to efficiently move the air to the desired points of application.

In one embodiment, the heat from the heat exchanger is directed primarily to the inside of the clamshell doors so that their temperature is raised well above that of the outside ambient air, so that any icing that tends to accrete in the space between the seals is minimized.

Figure 5A:
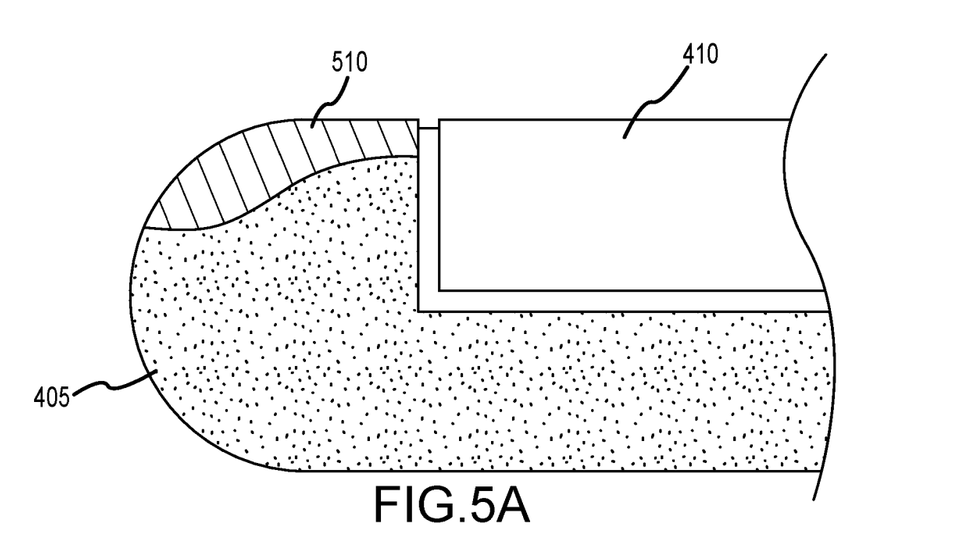
FIG. 5A shows a side view of the clamshell shroud system when stowed, or not extended.
Figure 5B:
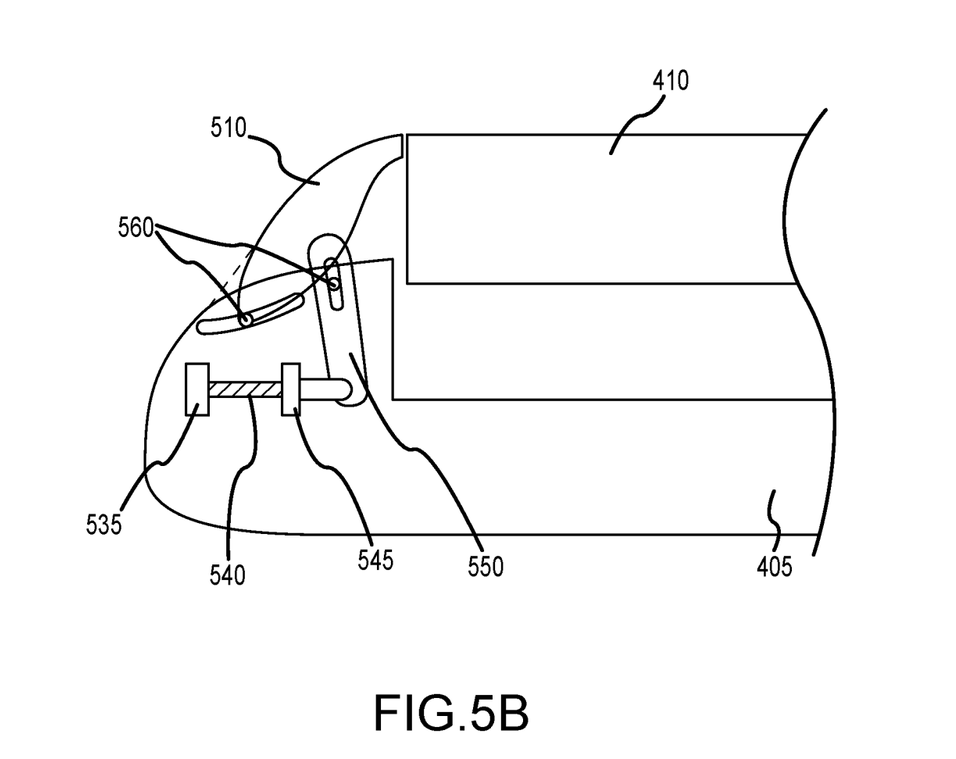
FIG. 5B shows a side view of the clamshell shroud system when fully deployed and closed over the propellers, in the fully-shrouded position.

FIG. 5A shows the boom 405 with the clamshell doors 410 secured in their retracted position against the boom structure. Also shown is a front door assembly 510 nestled into the nose of the boom, also in a retracted position. FIG. 5B shows the system in the enclosed or shrouded position.

Once the clamshell doors 410 have deployed to the fully shrouded position, the front door assembly 510 is deployed. This assembly fits snugly into the boom structure 405 nose cone, similar to the way that the clamshell doors are fitted to the sides of the boom. An actuator 535 drives a jackscrew 540 which moves a collar 5450 to which an actuating arm 550 is attached. The front door assembly 510 and its actuating arm 550 are guided by pins 560 that travel in tracks or slots so as to constrain the movement of these parts so that the locus of the rearward tip of this door moves up and back and at the defined end of travel contacts the leading edge of the clamshell doors in the shrouded position. To avoid jamming, the front door assembly 510 at the nose of the boom 405 does not move until it can be assured that the clamshell doors 410 will have fully completed their motion before the front door assembly 510 at the nose touches them.

Closure involves the retraction of the door at the nose prior to retracting the clamshell doors. Actuators used can be electrically or hydraulically operated. Pneumatic systems are less desirable because of the difficulty in developing sufficient pressure at altitude to ensure operation, in addition to making certain that the actuating air is always clean and dry.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

While there have been described above the principles of the present invention in conjunction with the optimization of an unmanned aerial vehicle, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:

1. A system for optimizing energy and aerodynamic efficiencies in an unmanned cargo-carrying aircraft, the system comprising:

an unmanned aerial vehicle (UAV) having a plurality of rotors for vertical flight and at least one wing assembly, one or more propellers, and a canard for horizontal flight, a communication system, and a hybrid drivetrain, the hybrid drivetrain mounted on the UAV, and the hybrid drivetrain including a combustion engine coupled to a motor/generator and to an electrical distribution system;

a detachable cargo container wherein the detachable cargo container is engaged by a retraction/extension mechanism supplied with power from the electrical distribution system;

a rotor-shrouding mechanism for each rotor mounted on the UAV having two clamshell doors, each clamshell door, when retracted, positioned substantially parallel to the relative airflow through which the UAV moves while in horizontal flight substantially conforming with a UAV shape limiting rotor downwash interaction and each clamshell door joining, when deployed, to shroud each rotor, and a front shroud positioned to mate with each clamshell door fully shrouding each rotor, the rotor-shrouding mechanism supplied with power from the electrical distribution system wherein responsive to the at least one wing assembly and canard generating sufficient lift to support the UAV in horizontal flight, each of the plurality of rotors are aligned with airflow through which the UAV moves in horizontal flight and shrouded by the two clamshell doors and the front shroud;

a processor mounted on the UAV, the processor capable of executing instructions and programmed to allocate power from the electrical distribution system and to operate a flight control system, and wherein the processor is communicatively coupled to the communication system, the hybrid drivetrain, the retraction/extension mechanism, and the rotor-shrouding mechanism.

2. The system of claim 1, wherein the processor allocates power from the electrical distribution system according to information provided from the flight control system.

3. The system of claim 2, wherein the flight control system senses UAV modes of movement and directs flight control and hybrid drivetrain functions using sensed UAV modes of movement.

4. The system of claim 1, wherein the rotor-shrouding mechanism raises the two clamshell doors to cover each of the plurality of rotors when each of the plurality of rotors is not rotating.

5. The system of claim 4, wherein each of the plurality of rotors are held in an indexed position when the rotor is not rotating.

6. The system of claim 1, wherein the hybrid drivetrain supplies power to drive the plurality of rotors providing substantially vertical thrust and power to drive the one or more propellers providing substantially horizontal thrust.

7. The system of claim 6, wherein power to drive the one or more propellers providing substantially horizontal thrust is either electrical power supplied by the electrical distribution system via a battery pack or mechanical power supplied by the combustion engine.

8. The system of claim 6, wherein the flight control system controls a propeller clutch to engage or disengage from a gearbox the one or more propellers providing substantially horizontal thrust, as controlled by the flight control system.

9. The system of claim 8, wherein the flight control system controls when the power to the gearbox sources from the motor/generator or from the combustion engine.

10. The system of claim 6 wherein the combustion engine drives the motor/generator thereby producing electrical power supplied to the electrical distribution system powering the one or more propellers providing substantially horizontal thrust.

11. The system of claim 1, wherein the retraction/extension mechanism retracts or extends the detachable cargo container to or from the UAV, respectively, and upon suspension of the detachable cargo container apart from any ground contact by the retraction/extension mechanism, the retraction/extension mechanism determines a cargo container weight metric and cargo container balance metric.

12. The system of claim 11, wherein responsive to the cargo container weight metric and the cargo container balance metric meeting a predetermined weight criteria and a predetermined balance criteria, the retraction/extension mechanism positions the detachable cargo container to a close engagement with the UAV sufficient for a coupling mechanism to fixedly attach the cargo container to the UAV.

13. The system of claim 12, wherein the cargo weight metric and the cargo container balance metric form a loading profile, and responsive to the cargo weight metric and the cargo container balance metric meeting the predetermined weight criteria and the predetermined balance criteria, determining if the loading profile is within a UAV performance envelope and within an assigned mission profile.

14. The system of claim 1, wherein the processor executes instructions performing a method for flight parameter balancing, the method comprising;
calculating necessary fuel weight requirements to fulfill a cargo delivery mission;
receiving the cargo container weight metric and the cargo container balance metric from the retraction/extension mechanism;
determining a maximum UAV takeoff weight and a maximum cargo container weight;
and calculating, using the cargo container weight metric and the cargo container balance metric, whether the UAV will remain within the predetermined weight criteria and the predetermined balance criteria for the entirety of the cargo delivery mission.

* * * * *